United States Patent [19]
Takami et al.

[11] Patent Number: 5,217,931
[45] Date of Patent: Jun. 8, 1993

[54] CERAMIC SLIDING MEMBER AND METHOD OF MANUFACTURING THE SAME

[75] Inventors: Akihide Takami; Nobuo Sakate; Tsutomu Shimizu, all of Hiroshima, Japan

[73] Assignee: Mazda Motor Corporation, Hiroshima, Japan

[21] Appl. No.: 841,302

[22] Filed: Feb. 28, 1992

Related U.S. Application Data

[63] Continuation of Ser. No. 472,063, Jan. 30, 1990, abandoned.

[51] Int. Cl.$^5$ ............................................. C04B 35/58
[52] U.S. Cl. ........................................ 501/88; 501/97; 501/98; 264/65
[58] Field of Search ................. 501/97, 98, 88; 264/65

[56] References Cited

U.S. PATENT DOCUMENTS

| 4,134,947 | 1/1979 | Oda et al. ........................... 264/65 |
| 4,609,633 | 9/1986 | Fukuhara et al. .................... 501/97 |

*Primary Examiner*—Mark L. Bell
*Assistant Examiner*—Alan Wright
*Attorney, Agent, or Firm*—Sixbey, Friedman, Leedom & Ferguson

[57] ABSTRACT

A ceramic sliding member is formed of sintered silicon nitride material which contains $Si_3N_4$ as the major component and further contains Y, Mg and Ce, the Y content being 2 to 20% by weight in terms of $Y_2O_3$, the Mg content being 0.1 to 0.9% by weight in terms of MgO, and the Ce content being 1 to 10% by weight in terms of $CeO_2$.

13 Claims, 5 Drawing Sheets

F I G. 1a
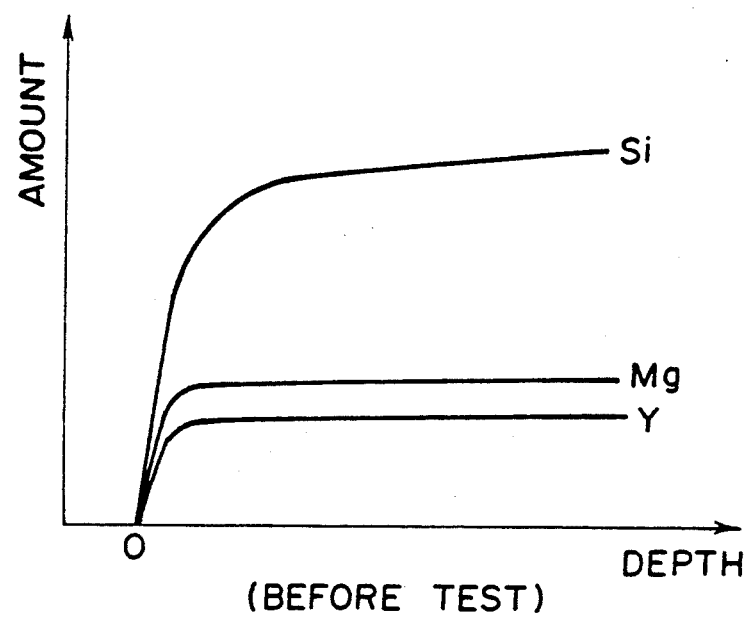
(BEFORE TEST)
F I G. 1b
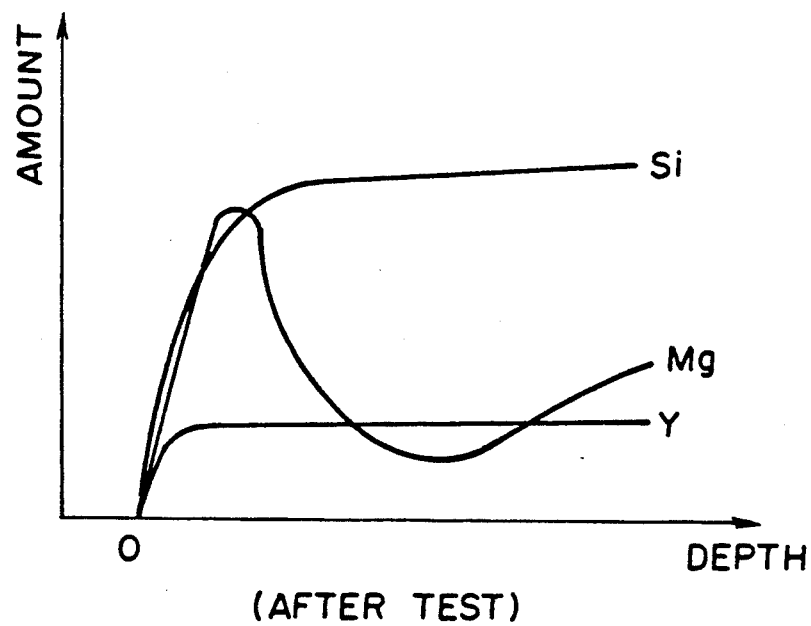
(AFTER TEST)

CERAMIC SLIDING MEMBER AND METHOD OF MANUFACTURING THE SAME

This application is a continuation of Ser. No. 07/472,063, filed Jan. 30, 1990, now abandoned.

BACKGROUND OF THE INVENTION

1. Field of the Invention

This invention relates to a ceramic sliding member and a method of manufacturing the same.

2. Description of the Prior Art

Sintered silicon carbide material, sintered silicon nitride material and the like are expected as ceramics for forming a sliding member. However, the sintered silicon carbide material is inferior in fracture toughness and strength though superior in anti-seizing property, and accordingly, the component formed of the sintered silicon carbide material is disadvantageous in that it is apt to crack or fracture while it is processed, is incorporated or is in operation. On the other hand, the sintered silicon nitride material is superior in resistance to heat, resistance to heat shock, mechanical strength and resistance to corrosion, and accordingly, it has been expected as the material for forming various mechanical parts which operate under severe conditions under which metal parts cannot be used.

Since $Si_3N_4$ cannot be in liquid phase, an auxiliary for firmly binding particles is required when sintering silicon nitride material. As the auxiliary, there has been wide used an oxide which melts and forms a liquid phase or combines with other components to form a low-melting compound. Typically, the auxiliary is $Y_2O_3$, $Al_2O_3$ or BoO. The properties of sintered silicon nitride material depends not only on the properties of $Si_3N_4$ but also on the properties of the auxiliary which forms the grain boundaries in the sintered silicon nitride material. There has been well known a sintered silicon nitride material which is formed by adding about 10 wt % $Y_2O_3$, $Al_2O_3$ or the like to $Si_3N_4$ (the major component) and sintering the mixture in an inert gas atmosphere. However, the conventional sintered silicon nitride material cannot be free from the problems inherent to sintered materials, e.g., lack of reliability such as defect due to foreign particles, pores or the like, or lack of the absolute strength.

In Japanese Unexamined Patent Publication No. 61-68373, there is disclosed a sintered silicon nitride material which is obtained by adding a predetermined amount of $Y_2O_3$, MgO and $CeO_2$ to $Si_3N_4$ and sintering the mixture.

Such a sintered silicon nitride material which is sintered using $Y_2O_3$, MgO and $CeO_2$ as the auxiliary is high in strength and superior in resistance to impact. However sliding tests in which chrome-plated material was used as the mate material have revealed that the sintered silicon nitride material is slightly inferior in resistance to wear and in anti-seizing property.

SUMMARY OF THE INVENTION

In view of the foregoing observations and description, the primary object of the present invention is to provide a sliding member which is formed of a sintered silicon nitride material and is extremely superior in resistance to wear and in anti-seizing property.

Another object of the present invention is to provide a method of manufacturing a sliding member which is formed of a sintered silicon nitride material and is extremely superior in resistance to wear and in anti-seizing property.

The inventors of the present invention inspected the cross-sectional distribution of Si, Mg and Y of the test piece before and after the sliding test by an electron-probe microanalysis method, and obtained the results shown in FIGS. 1a and 1b, wherein the ordinate represents the relative contents of the elements and the absoissa represents the depth of the cross-section.

As can be understood from FIGS. 1a and 1b, the Mg content after the sliding test is extremely high near the surface. This suggests that the inner Mg content was melted by the heat produced on the surface of the test piece during the sliding test and infiltrated into the surface layer of the test piece. The increase in the Mg content in the surface layer of the test piece can deteriorate the resistance to wear and the anti-seizing property.

Thus the inventors of the present invention have discovered that when the amount of MgO which is used as a sintering auxiliary is within a certain range, the sintered silicon nitride material has an extremely superior resistance to wear and an extremely superior anti-seizing property.

The present invention has been made based on this discovery.

That is, in accordance with a first aspect of the present invention, there is provided a ceramic sliding member formed of sintered silicon nitride material which contains $Si_3N_4$ as the major component and further contains Y, Mg and Ce, the Y content being 2 to 20% by weight in terms of $Y_2O_3$, the Mg content being 0.1 to 0.9% by weight in terms of MgO, and the ce content being 1 to 10% by weight in terms of $CeO_2$.

When the Mg content in terms of MgO is not less than 1% by weight, seizing phenomenon will occur, and as the Mg content increases, the seizing phenomenon will occur more frequently. On the other hand, when the Mg content in terms of MgO is not more than 0.1% by weight, the strength of the sliding member becomes too low. When the Y content in terms of $Y_2O_3$ and the Mg content in terms of MgO exceed the respective upper limits (i.e., 20% by weight and 10% by weight), growth of the system is promoted and the resistance to impact becomes too low. And when the Y content in terms of $Y_2O_3$ and the Mg content in terms of MgO are less than the respective lower limits (i.e., 2% by weight and 1% by weight), the composition cannot be satisfactorily sintered and the strength of the product is lowered. Preferably, a small amount of carbide such as SiC, TiC and the like is added in order to improve the sliding properties. MgO is an oxide which is effective to form a liquid phase at a low temperature, and it is effective even in a small amount. However, when the amount of MgO is very small, it is preferred that one or more other compounds (e.g., oxides, nitrides, borides and carbides of the group IIa, IIIa, IVa and Va elements other than Ce and Mg; composite compounds of these compounds; oxides, nitrides, borides and carbides of lanthanide; composite compound of these compounds) be includes in an amount not larger than 15% by weight. It is preferred that the impurity content be not larger than 0.5% by weight.

In accordance with a second aspect of the present invention, there is provided a ceramic sliding member formed of sintered silicon nitride material which contains $Si_3N_4$ as the major component and further contains Y, Mg, Ce, and at least one of the group IIa, IIIa, IVa and Va elements other than Ce and Mg, the Y content being 2 to 20% by weight in terms of $Y_2O_3$, the Mg content being 0.1 to 0.9% by weight in terms of MgO, the Ce content being 0.1 to 0.9% by weight in terms of $CeO_2$ and the content of said at least one element being not more than 15% by weight in terms of oxides, nitrides, borides and carbides of the group IIa, IIIa, IVa and Va elements other than Ce and Mg, and composite compounds of these compounds.

Also the inner Ce content is melted by the heat produced on the surface and infiltrates into the surface layer of the product. Also the increase in the Ce content in the surface layer can deteriorate the resistance to wear and the anti-seizing property. Accordingly, in accordance with the second aspect of the present invention, not only the Mg content but also the Ce content is reduced. However, when the Mg content and the Ce content are reduced in this manner, the absolute amount of the sintering auxiliary becomes insufficient. In order to compensate for the shortage of the sintering auxiliary and ensure the strength of the sintered material, one or more of the group IIa, IIIa, IVa and Va elements other than Ce and Mg are added. When the content of such elements is more than 15% by weight in terms of oxides, nitrides, borides and carbides of the group IIa, IIIa, IVa and Va elements other than Ce and Mg, and composite compounds of these compounds, growth of the system is promoted and the resistance to impact becomes too low. When the amount of MgO and $CeO_2$ is very small, it is preferred that one or more other compounds (e.g., oxides, nitrides, borides and carbides of lanthanide) composite compounds of these compounds) be included in an amount not larger than 15% by weight. It is preferred that the impurity content be not larger than 0.5% by weight.

In accordance with a third aspect of the present invention, there is provided a method of manufacturing a ceramic sliding member characterized in that $Si_3N_4$ is ground together with 2 to 20% by weight of $Y_2O_3$, 0.1 to 0.9% by weight of MgO and 1 to 10% by weight of $CeO_2$, the average particles size of the MgO being not larger than 1500Å, and the composition thus obtained is pressed into a shape and fired at 1600° to 1850° C. in an inert gas atmosphere.

When the average particle size of the MgO is not larger than 1500Å, atomization of the MgO is facilitated when the $Si_3N_4$ is ground together with the sintering auxiliary, and the MgO particles can be better distributed over the sintered material. Since the amount of MgO is limited in the present invention, the distribution of the MgO largely affects the uniformity and the strength of the product. FIG. 2 shows the relation between the strength (four-point bending strength) of the product and the average particle size of the MgO. As can be understood from FIG. 2, the strength of the sintered product becomes too low when the average particle size is larger than 1500Å. The reason may be considered that the structure of the sintered material is uniform as shown in FIG. 3(a) when the average particle size of MgO is small, e.g., 1000Å and, on the other hand, when the average particle size of MgO is large, e.g., 2000Å, the structure of the sintered material is ununiform as shown in FIG. 3(b) and the material is apt to break along the boundaries between the portions which are rich in MgO (the hatched portions in FIG. 3b) and the portions which are poor in MgO. Though it is preferred that the so-called hot hydrostatic pressing is employed when the composition is fired, the normal pressure firing may be employed. However, the density of the sintered material should not be lower than 95%. Otherwise, the mechanical properties of the product deteriorate. The inert gas in which the composition is fired is preferably nitrogen gas in order to suppress decomposition of $Si_3N_4$ during firing. When the firing temperature is not higher than 1600° C., the composition cannot be sufficiently fired and a dense structure cannot be obtained. On the other hand, when the firing temperature is not lower than 1850° C., decomposition and vaporization of $Si_3N_4$ become violent, and a dense structure cannot be obtained. When the sintered material is held at 1200° to 1500° C. for a while during cooling after the firing, crystallization of the glass phase in the grain boundaries occurs, which contributes to increase in the strength of the product. However, preferably the crystallization is limited to such a degree that only a part of the grain boundary phase crystallizes.

In accordance with a fourth aspect of the present invention, there is provided a method of manufacturing a ceramic sliding member characterized in the $Si_3N_4$ is ground together with 2 to 20% by weight of $Y_2O_3$, 0.1 to 0.9% by weight of MgO and 1 to 10% be weight of $CeO_2$, the composition thus obtained is pressed into a shape and fired at 1600° to 1850° C. in an inert gas atmosphere, and the sintered product thus obtained is subjected to desired machining and is heat-treated at 1100° to 1500° C. for 1 to 5 hours.

When the sintered product is heat-treated at 1100° to 1500° C. for 1 to 5 hours before the finishing operation after the machining, the glassy phase is softened and the micro-cracking and the residual stress due to the machining are relieved, and at the same time, crystallization of the grain boundaries is promoted. If the heat-treating temperature is not higher than 1100° C., the glassy phase cannot be sufficiently softened. On the other hand, if the heat-treating temperature is not lower than 1500° C., the crystallization of the grain boundaries is excessively promoted.

BRIEF DESCRIPTION OF THE DRAWINGS

FIGS. 1a and 1b are views which respectively show the cross-sectional distribution of Si, Mg and Y of the test piece before and after the sliding test by an electron-probe microanalysis method.

DETAILED DESCRIPTION OF THE INVENTION

Figure 2:
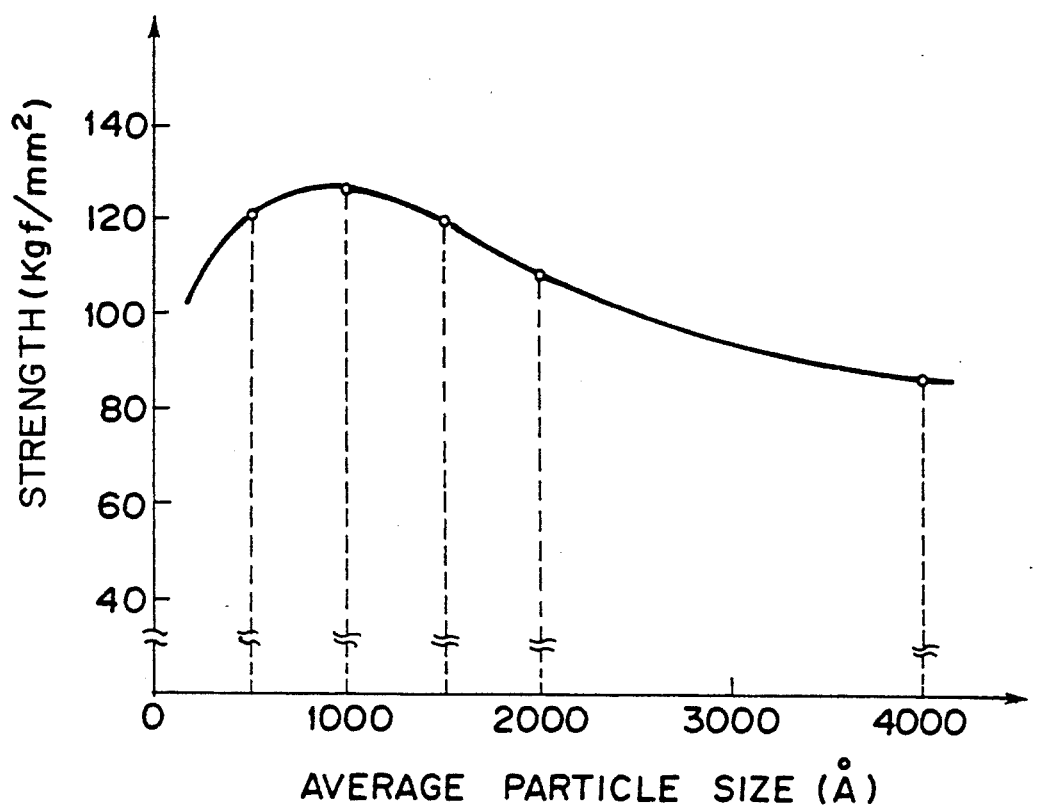
FIG. 2 is a view showing the relation between the average particle size of MgO powder and the strength of the sintered body.

The present invention will be described in more detail on the basis of several examples.

(TiC in this particular example). The No. 9, No. 10 and No. 11 sliding members included at least one of oxides, nitrides, borides and carbides of the group IIa, IIIa, IVa and Va elements other than Ce and Mg an composite compounds of these compounds. The No. 15 sliding member included one or more of oxides, nitrides, borides and carbides of lanthanide and composite compounds of these compounds.

TABLE 1

|  | NO | composition (wt %) | | | | | firing condition | mechanical properties | | sliding properties | |
|---|---|---|---|---|---|---|---|---|---|---|---|
|  |  | $Si_3N_4$ | $Y_2O_3$ | $CeO_2$ | MgO | Others |  | strength | impact value | wear | evaluation |
| this invention | 1 | 93.5 | 4 | 2 | 0.5 |  | 1700° C. × 2 Hr | 155 | 113 | $2.4 \times 10^{-2}$ | ○ |
|  | 2 | 91.5 | 4 | 4 | 0.8 |  | 1700° C. × 1 Hr | 162 | 122 | $2.1 \times 10^{-2}$ | ○ |
|  | 3 | 91.6 | 4 | 4 | 0.4 |  | 1700° C. × 1 Hr | 150 | 108 | $1.4 \times 10^{-2}$ | ○ |
|  | 4 | 92.6 | 6 | 1 | 0.4 |  | 1700° C. × 1 Hr | 142 | 82 | $1.1 \times 10^{-2}$ | ○ |
|  | 5 | 95.9 | 2 | 2 | 0.4 |  | 1700° C. × 1 Hr | 130 | 77 | $4.3 \times 10^{-3}$ | ○ |
|  | 6 | 87.9 | 10 | 2 | 0.1 |  | 1700° C. × 1 Hr | 133 | 74 | $8.9 \times 10^{-3}$ | ○ |
|  | 7 | 87.5 | 2 | 10 | 0.5 |  | 1700° C. × 1 Hr | 128 | 65 | $1.6 \times 10^{-2}$ | ○ |
|  | 8 | 91.6 | 4 | 2 | 0.5 |  | 1700° C. × 2 Hr | 144 | 81 | $7.1 \times 10^{-3}$ | ○ |
|  | 9 | 89.6 | 4 | 4 | 0.4 | $ZrO_2$ 2 | 1700° C. × 1 Hr | 130 | 75 | $1.3 \times 10^{-2}$ | ○ |
|  | 10 | 89.6 | 4 | 4 | 0.4 | $ZrO_2$ 2 | 1700° C. × 1 Hr | 136 | 77 | $1.5 \times 10^{-2}$ | ○ |
|  | 11 | 89.6 | 6 | 2 | 0.4 | $La_2O_3$ 2 | 1800° C. × 1 Hr | 142 | 84 | $9.2 \times 10^{-3}$ | ○ |
|  | 12 | 86.7 | 6 | 2 | 0.3 | TiC 5 | 1750° C. × 1 Hr | 148 | 96 | $7.7 \times 10^{-3}$ | ○ |
|  | 13 | 89.6 | 4 | 4 | 0.4 |  | 1700° C. × 1 Hr | 151 | 102 | $3.5 \times 10^{-3}$ | ○ |
|  | 14 | 89.6 | 4 | 4 | 0.4 |  | 1650° C. × 1.5 Hr | 160 | 110 | $5.6 \times 10^{-3}$ | ○ |
|  | 15 | 86.7 | 6 | 2 | 0.4 | NbN 5 | 1750° C. × 1 Hr | 141 | 81 | $1.4 \times 10^{-2}$ | ○ |
|  | 16 | 86.7 | 6 | 2 | 0.3 | TiC 5 | 1650° C. × 1.5 Hr | 138 | 65 | $5.7 \times 10^{-3}$ | ○ |
|  | 17 | 90.5 | 4 | 2 | 0.5 | TiC 3 | 1700° C. × 1 Hr | 130 | 72 | $1.2 \times 10^{-2}$ | ○ |
| control | 18 | 88.0 | 4 | 4 | 4 |  | 1700° C. × 1 Hr | 130 | 74 | — | X |
|  | 19 | 90.0 | 4 | 2 | 4 |  | 1700° C. × 1 Hr | 133 | 76 | $1.0 \times 10^{-2}$ | X |
|  | 20 | 90.0 | 4 | 2 | 4 |  | 1700° C. × 1 Hr | 142 | 82 | $3.4 \times 10^{-2}$ | X |
|  | 21 | 78.0 | 20.5 | 1 | 0.5 |  | 1700° C. × 1 Hr | 125 | 65 | $3.1 \times 10^{-2}$ | X |
|  | 22 | 94.0 | 1.5 | 4 | 0.5 |  | 1800° C. × 1 Hr | 118 | 54 | $8.6 \times 10^{-2}$ | X |
|  | 23 | 93.5 | 6 |  | 0.5 |  | 1700° C. × 1 Hr | 115 | 57 | $1.3 \times 10^{-2}$ | X |
|  | 24 | 81.5 | 6 | 12 | 0.5 |  | 1700° C. × 1 Hr | 123 | 68 | $4.0 \times 10^{-2}$ | X |
|  | 25 | 74.6 | 4 | 4 | 0.4 | TiC 17 | 1750° C. × 2 Hr | 105 | 52 | $3.2 \times 10^{-2}$ | X |

EXAMPLE 1

$Si_3N_4$ powder, $Y_2O_3$ powder, $CeO_2$ powder, MgO powder and powder of other additives were prepared in various proportions, and each mixture was further mixed and ground by an oscillating mill. Each of the compositions thus obtained was dried, and the dried composition was pressed into a shape and fired by a hot press apparatus or a hot hydrostatic pressing apparatus at the firing temperature shown in Table 1 in a nitrogen gas atmosphere. Then the sintered product was machined and finished. In this manner, No. 1 to No. 17 sliding members in accordance with the present invention were made. The compositions for the No. 1 to No. 17 sliding members were as shown in Table 1. The average particle sizes of the $Si_3N_4$ powder, the $CeO_2$ powder and the MgO powder were 0.4 μm, 0.4 μm and 0.1 μm, respectively. In the similar manner, No. 18 to No. 26 sliding members were made as the controls. The compositions for the No. 18 to No. 26 sliding members were as shown in Table 1. The chemical analysis of the No. 1 to No. 26 sliding members revealed that each member included Y, Ce and Mg in substantially the same proportion as the composition for forming it. The strength (kgf/mm²), the impact value (Kgfm), the wear (g) and the evaluation for the sliding properties of each sliding member are shown in Table 1. Only the No. 12 sliding member was fired by the use of the hot hydrostatic pressing apparatus, and the other sliding members were all fired by the use of the hot press apparatus. The No. 10, No. 14, No. 16 and No. 20 sliding members were obtained by holding the sintered product at 1300° C. for a while during cooling after the firing. The No. 12, No. 16, No. 17 and No. 25 sliding members included carbide As can be understood from Table 1, the sliding members in accordance with the present invention (the No. 1 to No. 17 sliding members) all exhibited superior sliding properties and the control sliding members (the No. 18 to No. 26 sliding members) were inferior to the sliding members in accordance with the present invention in the sliding properties. For example, the No. 18 and No. 22 sliding members (controls) were large in wear, and particularly, in the case of the No. 18 sliding member, the wear was unmeasured. In the case of the No. 19, No. 20 and No. 24 sliding members (controls), seizing was about to occur. The No. 21, No. 23 and No. 25 sliding members (controls) attacked the mate member.

Figure 4A:
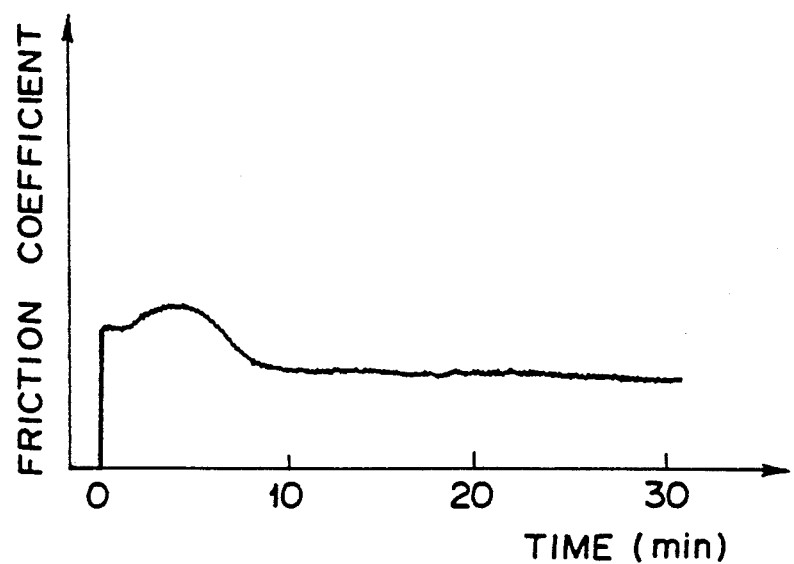
FIG. 4a shows the change of friction coefficient in the No. 1 sliding member.
Figure 4B:
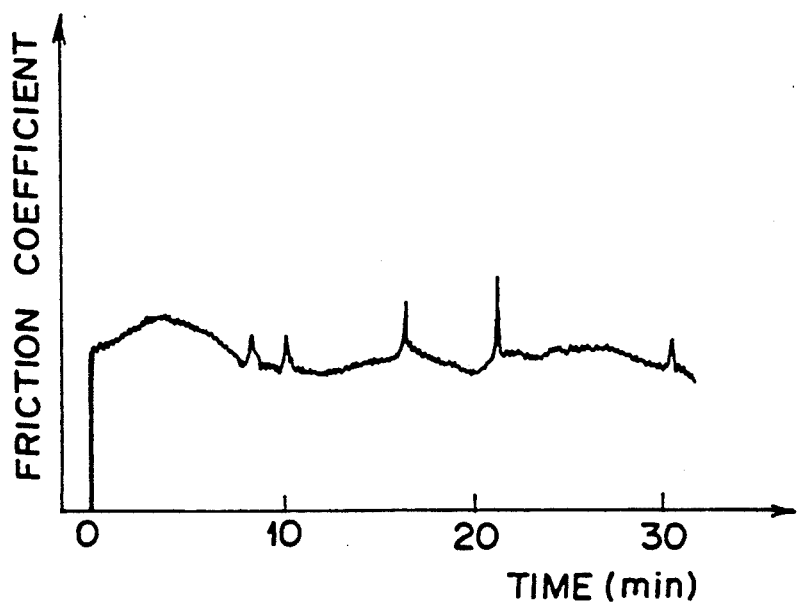
FIG. 4b shows the change of friction coefficient in the No. 19 sliding member.

The No. 1 sliding member (in accordance with the present invention) and the No. 19 sliding member (control) were subjected to the sliding test. The result was as shown in FIGS. 4a and 4b. As can be understood from FIGS. 4a and 4b, in the case of the No. 1 sliding member, the friction coefficient did not abruptly increase. On the other hand, in the case of the No. 19 sliding member, the friction coefficient locally increased abruptly, which fact suggested that seizing occurred during the sliding test.

EXAMPLE 2

A composition powder which was the same as the composition for the No. 1 sliding member in Example 1 was set in a rubber mold and pressed at 3 ton/cm², and then fired at 1800° C. for three hours in a nitrogen gas atmosphere (8 atm). the relative density of the sintered body was 96%. A test piece made of the sintered body was subjected to the sliding test similar to that accomplished in Example 1. The test piece exhibited superior sliding properties though the wear of the test piece itself was slightly large.

EXAMPLE 3

Figure 3A:
FIG. 3a shows the cross-section and the breaking state of the sintered body which is obtained by the use of MgO powder whose average particle size is 1000Å.
Figure 3B:
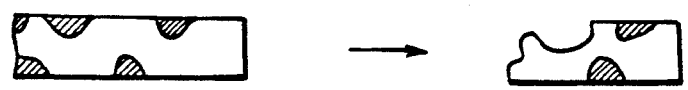
FIG. 3b shows the cross-section and the breaking state of the sintered body which is obtained by the use of MgO powder whose average particle size is 2000Å.

90.5 wt % of $Si_3N_4$ powder (90% a), 7 wt % of $Y_2O_3$ powder, 2 wt % of $CeO_2$ powder and 0.5 wt % of MgO powder were mixed and ground for 25 hours in solvent added with suitable dispersant by an oscillating mill. The slurry obtained was dried by a spray drier. In this manner, No. 1 to No. 5 samples were prepared. For all the samples, $Si_3N_4$ powder whose average particle size was 0.1 μm, $Y_2O_3$ powder whose average particle size was 0.4 μm, and $CeO_2$ powder whose average particle size was 0.4 μm were used. The average particle sizes of the MgO powders for the No. 1 to No. 5 samples were 500Å, 1000Å, 1500Å, 2000Å and 4000Å, respectively. The samples were temporarily pressed by a metal mold and then fired for 2 hours at 1750° C. in a nitrogen gas atmosphere by the use of hot press apparatus. The sintered body obtained were processed into test pieces and the mechanical properties of the test pieces are checked. The result was as shown in FIG. 3.

That is, the test pieces which were obtained from the compositions having MgO powder whose average particle sizes were larger than 2000Å were inferior to the test pieces in the strength by about 20%. Visual inspection of the test pieces which were obtained from the No. 4 sample (the average particle size of the MgO powder being 2000Å) revealed that the structure of the test piece was ununiform as shown in FIG. 3($b$). The No. 4 test piece broke along the outer edge of the hatched portion during the strength test. That is, when the average particle size of the MgO powder was large, the dispersion of the MgO powder deteriorated and the structure of the sintered body became ununiform. Thus, there was produced a strength difference between the portions which were rich in MgO (the hatched portions in FIG. 3$b$) and the portions which were poor in MgO, and the strength of the test piece was governed by the weaker portion. On the other hand, the test piece obtained from the No. 2 sample (the average particle size of the MgO powder being 1000521 ) was uniform in structure as shown in FIG. 3($a$), and broke at the limit of its mechanical strength.

However, when the average particle size of the MgO powder is too small, the MgO powder will be kept aggregating due to intermolecular force and the dispersion of the MgO powder will deteriorate. It is preferred that the powders be mixed at least for 15 hours.

EXAMPLE 4

93.5 wt % of $Si_3N_4$ powder, 4 wt % of $Y_2O_3$ powder, 2 wt % of $CeO_2$ powder and 0.5 wt % of MgO powder were mixed and ground. The average particle sizes of the powders were 0.7 μm, 0.4 μm, 0.4 μm and 0.1 μm, respectively. The composition thus obtained was pressed into a shape and fired at 1700° C. for 1 hour in a nitrogen gas atmosphere. Then the sintered product was machined and heat-treated for 1 to 50 hours at 1100° to 1500° C. before being finished. In the sliding member thus obtained, the glassy phase was softened and the micro-cracking and the residual stress due to the machining were relieved, and at the same time, crystallization of the grain boundaries was promoted. It the heat-treating temperature is not higher than 1100° C., the glassy phase will not be sufficiently softened. On the other hand, if the heat-treating temperature is not lower than 1500° C., the crystallization of the grain boundaries will be excessively promoted.

EXAMPLE 5

Figure 5:
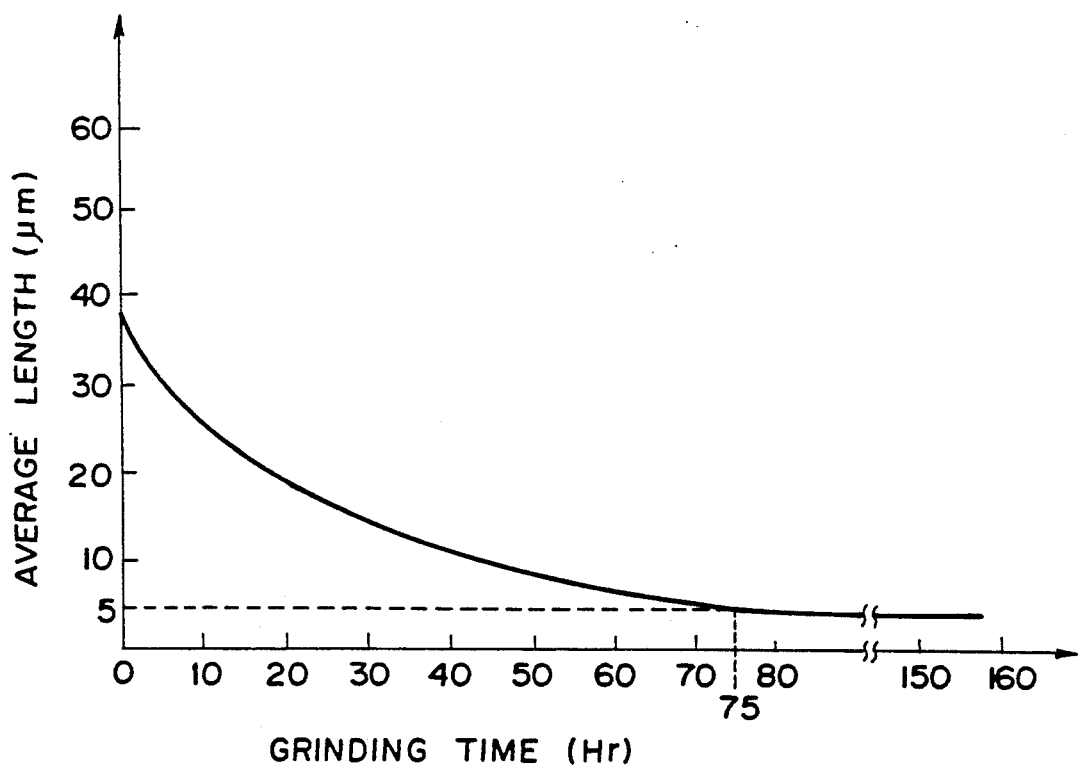
FIG. 5 shows the relation between the time for which the raw material powder mixture was ground and the average length of the SiC whiskers in the powder sample.
Figure 6:
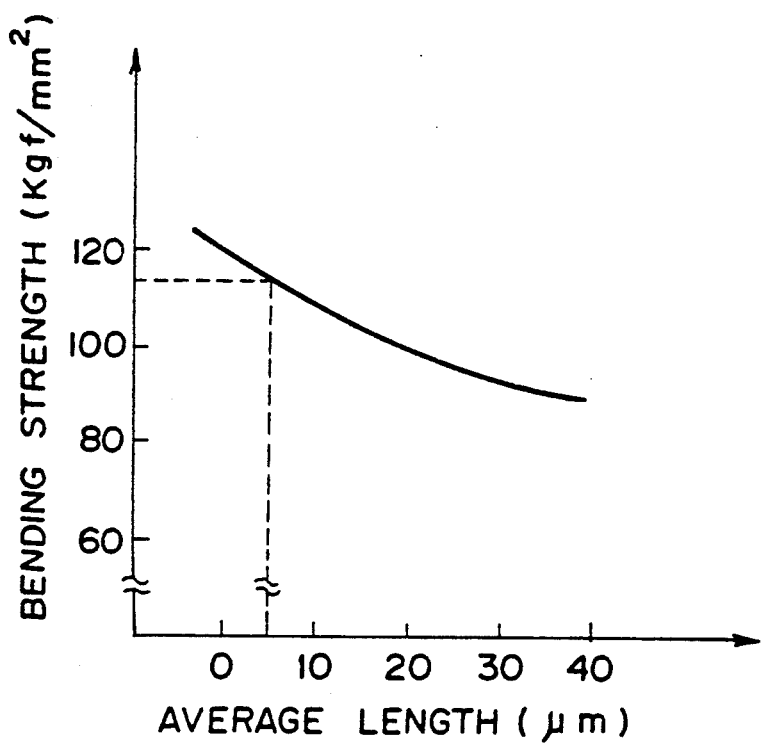
FIG. 6 shows the relation between the four-point bending strength of the test piece and the average length of the SiC whiskers.
Figure 7:
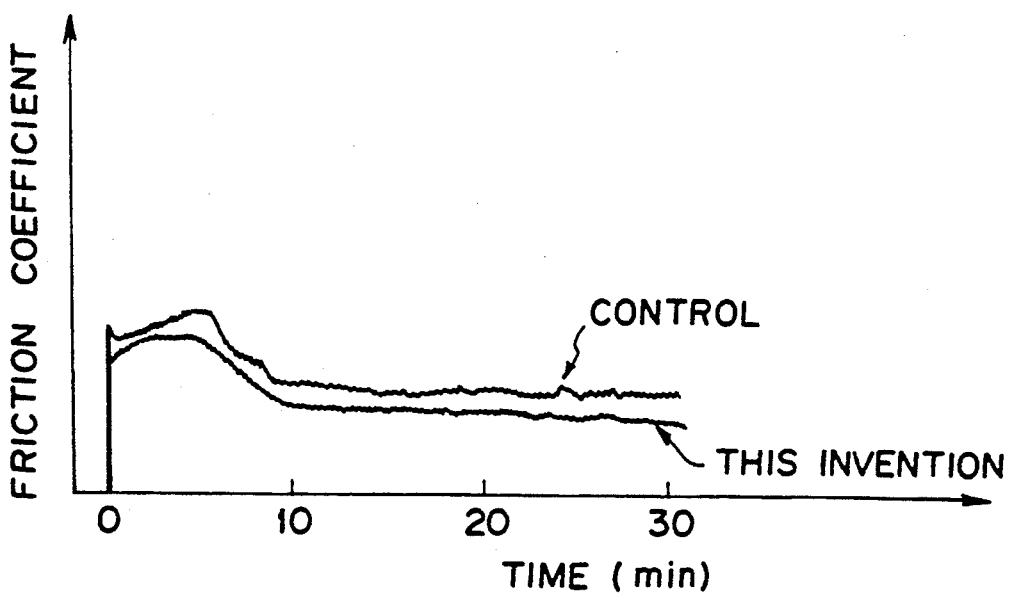
FIG. 7 shows the change of the friction coefficient with the sliding test time of the test piece including therein the SiC whiskers (in accordance with the present invention) in comparison with that of the test piece including therein no whiskers (control).

10 wt % of SiC whiskers (outer percentage) was added to a mixture of 91.5 wt % of $Si_3N_4$ powder (90% a), 6 wt % of $Y_2O_3$ powder, 2 wt % of $CeO_2$ powder and 0.5 wt % of MgO powder. The average particle sizes of the powders were 0.4 μm, 0.4 μm, 0.4 μm and 0.1 μm, respectively, and the SiC whiskers was 0.1 μm in diameter and 35 μm in length. The raw material powder mixture was stirred and mixed in solvent by the use of ultrasonic wave, and thereafter ground and intermixed by the use of a resin pot and a $Si_3N_4$ ball. In this manner, six composition powder samples were prepared, the first one being obtained by grinding the mixture for 1 hour, the second one for 5 hours, the third one for 10 hours, the fourth one for 30 hours, the fifth one for 75 hours and the other one for 150 hours. The samples were dried by a spray drier and fired at 1800° C. for 1 hour by a hot press. The powder samples were inspected through an electron microscope, and the sintered body were processed into test pieces and subjected to the strength test and the sliding test. The results were as shown in FIGS. 5, 6 and 7. In FIG. 5, the relation between the time for which the raw material powder mixture was ground and the average length of the SiC whiskers in the powder sample. FIG. 6 shows the relation between the four-point bending strength of the test piece and the average length of the SiC whiskers. FIG. 7 shows the change of the friction coefficient with the sliding test time of the test piece including therein the SiC whiskers (in accordance with the present invention) in comparison with that of the test piece including therein no whiskers (control).

As can be understood from FIGS. 5 to 7, when the average length of the SiC whiskers is not longer than 5 μm, a high strength sintered body can be obtained. In order to form SiC whiskers of such an average length, it is preferred that the raw material powder mixture be ground for at least 75 hours. Further, the sliding test has revealed that the sintered body including the SiC whiskers is superior in the sliding properties to that without whiskers.

EXAMPLE 6

10 wt % of SiC whiskers (outer passage) was added to a mixture of 91.5 wt % of $Si_3N_4$ powder, 5 wt % of $Y_2O_3$ powder, 2 wt % of $CeO_2$ powder, 0.5 wt % of MgO powder and 1 wt % $ZrO_2$. The raw material powder mixture was ground for 150 hours, and then dried and sintered. When the sintered body thus obtained was subjected to the inspection and the sliding test similar to those in Example 5. The results were substantially the same as in Example 5.

EXAMPLE 7

$Si_3N_4$ powder, $Y_2O_3$ powder, $CeO_2$ powder, MgO powder and powder of other additives were prepared in various proportions, and each mixture was further mixed and ground by an oscillating mill for about 25 hours. Each of the compositions thus obtained was dried, and the dried composition was pressed into a shape and fired by a hot press apparatus or a hot hydrostatic pressing apparatus at the firing temperature shown in Table 2 in a nitrogen gas atmosphere. Then the sintered product was machined and finished. In this manner, No. 1 to No. 11 sliding members in accordance with the present invention were made. The compositions for the No. 1 to No. 11 sliding members were as shown in Table 2. The average particle sizes of the $Si_3N_4$ powder, the $CeO_2$ powder and the MgO powder were 0.1 μm, 0.4 μm and 0.2 μm, respectively. In the similar manner, No. 12 to No. 19 sliding members were made as the controls. The compositions for the No. 12 to No. 19 sliding members were as shown in Table 2. The chemical analysis of the No. 1 to No. 19 sliding members revealed that each member included Y; Ce; Mg; oxides, nitrides, borides and carbides of the group IIa, IIIa, IVa and Va elements other than Ce and Mg; composite compounds of these compounds in substantially the same proportions as the composition for forming it. The strength (kgf/mm²), the impact value (Kgfm), the wear (g) and the evaluation for the sliding properties of each sliding member are shown in Table 2. The No. 3 to No. 9 and No. 12 to No. 17 sliding member was fired by the use of the hot hydrostatic pressing apparatus, and the other sliding members were all fired by the used of the hot press apparatus. The No. 6 and No. 11 sliding members were obtained by holding the sintered product at 1300° C. for a while during cooling after the firing. The No. 8 and No. 10 sliding members included at least one of oxides, nitrides, borides and carbides of lanthanide and composite compounds of these compounds.

Y content being 2 to 20% by weight in terms of $Y_2O_3$, the Mg content being 1.0 to 0.9% by weight in terms of MgO and the Ce content being 1 to 10% by weight in terms of $CeO_2$, and 3 to 10 wt % of a carbide selected from the group consisting of TiC and SiC.

2. A ceramic sliding member as defined in claim 1 in which impurities in said sintered silicon nitride material are not larger than 0.5% by weight.

3. A ceramic sliding member formed of sintered silicon nitride material consisting essentially of 2 to 20% by weight of $Y_2O_3$; 0.1 to 0.9% by weight of MgO; 0.1 to 0.1 to 10% by weight of $CeO_2$; not larger than 15% by weight of one or more of oxides, nitrides borides, carbides and composite compounds of group IIa, IIIa, IVa and Va elements other than Ce, Mg, Be, Sr, silicon carbide, titanium carbide and silicon nitrides; 3 to 10 wt % of a carbide selected from the group consisting of TiC and SiC; and the remainder of $Si_3N_4$.

4. A ceramic sliding member as defined in claim 3 in which impurities in said sintered silicon nitride material are not larger than 0.5% by weight.

5. A method of manufacturing a ceramic sliding member comprising grinding together a mixture consisting essentially of $Si_3N_4$, 2 to 20% by weight of $Y_2O_3$, 0.1 to 0.9% by weight of MgO and 1 to 10% by weight of $CeO_2$, the average particle size of the MgO being not larger than 1500 Å, adding 3 to 10 wt % of a carbide

TABLE 2

|  | NO | composition (wt %) | | | | | firing condition | mechanical properties | | sliding properties | |
|---|---|---|---|---|---|---|---|---|---|---|---|
|  |  | $Si_3N_4$ | $Y_2O_3$ | $CaO_2$ | MgO | Others |  | strength | impact value | wear | evaluation |
| this invention | 1 | 95.0 | 4 | 0.5 | 0.5 | $Al_2O_3$ 2 | 1750° C. × 1 Hr | 138 | 77 | $9.6 \times 10^{-3}$ | ◯ |
|  | 2 | 88.8 | 8 | 0.8 | 0.4 | $Al_2O_3$ 2 | 1750° C. × 1 Hr | 136 | 77 | $5.1 \times 10^{-3}$ | ◯ |
|  | 3 | 90.3 | 6 | 0.1 | 0.1 | $Al_2O_3$ 2 | 1700° C. × 1 Hr | 133 | 74 | $3.8 \times 10^{-3}$ | ◯ |
|  | 4 | 91.2 | 5 | 0.4 | 0.4 | $Al_2O_3$ 2 | 1700° C. × 1 Hr | 141 | 81 | $8.8 \times 10^{-3}$ | ◯ |
|  | 5 | 88.8 | 8 | 0.4 | 0.8 | $Al_2O_3$ 2 | 1700° C. × 1 Hr | 148 | 96 | $1.0 \times 10^{-2}$ | ◯ |
|  | 6 | 91.2 | 6 | 0.4 | 0.4 | $Al_2O_3$ 2 | 1750° C. × 1 Hr | 153 | 108 | $3.3 \times 10^{-3}$ | ◯ |
|  | 7 | 90.8 | 6 | 0.4 | 0.8 | $TiO_2$ 2 | 1750° C. × 1 Hr | 150 | 102 | $9.2 \times 10^{-3}$ | ◯ |
|  | 8 | 90.8 | 6 | 0.4 | 0.8 | $TiO_2$ 1 $Nd_2O_3$ 1 | 1750° C. × 1 Hr | 158 | 115 | $1.4 \times 10^{-2}$ | ◯ |
|  | 9 | 87.6 | 2 | 0.2 | 0.2 | $Al_2O_3$ 10 | 1750° C. × 1 Hr | 130 | 72 | $9.5 \times 0^{-3}$ | ◯ |
|  | 10 | 89.8 | 4 | 0.4 | 0.8 | $Sm_2O_3$ 3 $La_2O_3$ 2 | 1750° C. × 1 Hr | 138 | 65 | $7.8 \times 10^{-3}$ | ◯ |
|  | 11 | 90.8 | 4 | 0.4 | 0.8 | $Al_2O_3$ 1 SiC 3 | 1700° C. × 1 Hr | 141 | 82 | $4.1 \times 10^{-3}$ | ◯ |
| control | 12 | 95.5 | 4 |  | 0.5 |  | 1700° C. × 1 Hr | 124 | 57 | $1.8 \times 10^{-2}$ | ◯ |
|  | 13 | 95.5 | 4 | 0.5 |  |  | 1700° C. × 1 Hr | 117 | 54 | $2.4 \times 10^{-2}$ | X |
|  | 14 | 77.1 | 20.5 | 0.2 | 0.2 | $ZrO_2$ 2 | 1700° C. × 1 Hr | 122 | 68 | $1.8 \times 10^{-2}$ | X |
|  | 15 | 88.5 | 4 | 0.5 | 6 | $Al_2O_3$ 1 | 1700° C. × 1 Hr | 138 | 72 | — | X |
|  | 16 | 89.0 | 10 | 0.5 | 0.5 |  | 1700° C. × 1 Hr | 123 | 61 | $3.8 \times 10^{-2}$ | X |
|  | 17 | 89.0 | 10 | 0.5 | 0.5 |  | 1700° C. × 1 Hr | 125 | 65 | $4.2 \times 10^{-2}$ | X |
|  | 18 | 89.0 | 10 | 0.5 | 0.5 |  | 1700° C. × 1 Hr | 130 | 75 | $1.2 \times 10^{-3}$ | X |

As can be understood from Table 2, the sliding members in accordance with the present invention (the No. 1 to No. 11 sliding members) all exhibited superior sliding properties and the control sliding members (the No. 12 to No. 19 sliding members) were inferior to the sliding members in accordance with the present invention in the sliding properties. For example, the No. 16, No. 17 and No. 19 sliding members (controls) were large in wear, and in the case of the No. 13 sliding member, the wear was unmeasured due to serious seizing. The No. 14 and No. 18 sliding members (controls) attacked the mate member. The No. 12 and No. 13 sliding members were insufficient in strength.

We claim:

1. A ceramic sliding member formed of sintered silicon nitride material which consists essentially of $Si_3N_4$ as a major component, the oxides of Y, Mg and Ce, the selected from the group consisting of TiC and SiC, and pressing the composition thus obtained into a shape and firing at 1600° to 1850° C. in an inert gas atmosphere.

6. A method as defined in claim 5 in which the carbide is added as whiskers having an average length of not longer than 5 μm.

7. A method as defined in claim 5 in which the mixture of $Si_3N_4$, $Y_2O_3$, MgO, and carbide additive and $CeO_2$ is ground for at least 75 hours.

8. A method of manufacturing a ceramic sliding member comprising grinding a mixture consisting essentially of $Si_3N_4$, 2 to 20% by weight of $Y_2O_3$, 0.1 to 0.9% by weight of MgO and 1 to 10% by weight of $CeO_2$, adding 3 to 10 wt % of a carbide selected from the group consisting of TiC and SiC, pressing the composition thus obtained into a shape and firing at 1600° to 1850° C. in an inert gas atmosphere, and subjecting the sintered product thus obtained to desired machining and heat-treating at 1100° to 1500° C. for 1 to 5 hours.

9. A method as defined in claim 8 in which the carbide is added as whiskers having an average length of not longer than 5 μm.

10. A method as defined in claim 8 in which the mixture of $Si_3N_4$, $Y_2O_3$, MgO, carbide additive and $CeO_2$ is ground for at least 75 hours.

11. A ceramic sliding member formed of sintered silicon nitride material consisting essentially of 2 to 20% by weight of $Y_2O_3$; 0.1 to 0.9% by weight of MgO; 1 to 10% by weight of $CeO_2$; not larger than 15% by weight of one or more of oxides, nitrides, borides, carbides and composite compounds of lanthanide; 3 to 10 wt % of a carbide selected from the group consisting of TiC and SiC; and the remainder of $Si_3N_4$.

12. A ceramic sliding member as defined in claim 11 in which impurities in said sintered silicon nitride material are not larger than 0.5% by weight.

13. In combination, a ceramic sliding member formed of sintered silicon nitride material comprising $Si_3N_4$ as a major component; Y, Mg and Ce as auxiliary components, the Y content being 2 to 20% by weight in terms of $Y_2O_3$, the Mg content being 0.1 to 0.9% by weight in terms of MgO, and the Ce content being 1 to 10% by weight in terms of $CeO_2$; and 3 to 10 wt % of a carbide selected from the group consisting of TiC and SiC; and a further member where said ceramic sliding member and the further member are slidably disposed with respect to each other.

* * * * *